US 6,709,761 B2

(12) United States Patent
Hirose et al.

(10) Patent No.: US 6,709,761 B2
(45) Date of Patent: Mar. 23, 2004

(54) MOLDED OBJECT OF THERMOPLASTIC RESIN AND COMPOSITION

(75) Inventors: Toshiyuki Hirose, Yamaguchi-ken (JP); Masao Maeno, Yamaguchi-ken (JP)

(73) Assignee: Mitsui Chemicals, Inc., Tokyo (JP)

(*) Notice: Subject to any disclaimer, the term of this patent is extended or adjusted under 35 U.S.C. 154(b) by 23 days.

(21) Appl. No.: 10/019,221

(22) PCT Filed: Apr. 27, 2001

(86) PCT No.: PCT/JP01/03709

§ 371 (c)(1),
(2), (4) Date: Dec. 28, 2001

(87) PCT Pub. No.: WO01/83612

PCT Pub. Date: Nov. 8, 2001

(65) Prior Publication Data

US 2002/0197499 A1 Dec. 26, 2002

(30) Foreign Application Priority Data

Apr. 28, 2000 (JP) ........................................ 2000-131245
Apr. 28, 2000 (JP) ........................................ 2000-131700

(51) Int. Cl.$^7$ ............................. B32B 27/32; C08J 5/18; C08L 23/26
(52) U.S. Cl. .................. 428/517; 428/520; 428/522; 428/910; 525/191; 525/216; 525/221; 525/240; 525/241
(58) Field of Search ..................... 428/517, 520, 428/522, 910; 525/191, 216, 221, 240, 241

(56) References Cited

U.S. PATENT DOCUMENTS 6,217,982 B1 * 4/2001 Dawson ...................... 428/151
6,313,241 B1 * 11/2001 Gauthier et al. ............ 526/160

FOREIGN PATENT DOCUMENTS

| EP | 1 270 203 A | 1/2003 |
| GB | 1 113 409 A | 5/1968 |
| JP | 05 271489 A | 10/1993 |
| WO | WO 00/66357 A | 11/2000 |

* cited by examiner

Primary Examiner—D. S. Nakarani
(74) Attorney, Agent, or Firm—Burns, Doane, Swecker & Mathis, LLP

(57) ABSTRACT

The invention provides a molded article having excellent impact, adhesive and printing properties. The invention also provides a molded article which has a low natural shrinkage percentage, a high shrinkage percentage in heating and a low density and is thus excellent in solvent resistance and hygiene.

The molded article comprises as the main components an ionomer (A), which is a metal salt of a copolymer containing an α-olefin unit and an unsaturated carboxylic acid unit, and a resin (B) having an alicyclic structure in its molecule.

A preferred embodiment is a molded article composed of a composition comprising the ionomer (A) and the resin (B), and a still preferred embodiment is a laminate comprising a layer containing the ionomer (A) having laminated thereon a layer containing the resin (B).

The invention further provides a composition comprising the ionomer (A) and the resin (B), which enables to produce the molded article.

21 Claims, No Drawings

MOLDED OBJECT OF THERMOPLASTIC RESIN AND COMPOSITION

TECHNICAL FIELD

The present invention relates to a molded article and s composition comprising as the main components an ionomer (A) and a resin (B) having an alicyclic structure in its molecule.

TECHNICAL BACKGROUND

Metal salts of α-olefin-unsaturated carboxylic acid copolymers are excellent in transparency, heat sealing, adhesion, pinhole resistance, elasticity and toughness, etc. and have been widely used in various fields for food packaging, daily necessities, industrial materials, etc. However, these metal salts of α-olefin-unsaturated carboxylic acid copolymers are inferior in view of rigidity, heat resistance or moisture barrier characteristics, and involved problems with resistance to acids or alkalis.

On the other hand, a resin containing an aliphatic structure in its molecule, including a cyclic olefin-based polymer, provides excellent transparency, heat resistance, rigidity and moisture barrier characteristics but is inferior in toughness, adhesion or elasticity. Thus, it has been desired to solve these problems.

A film made of the metal salt of α-olefin-unsaturated carboxylic acid copolymer is suitable for use of a heat shrinkable film because of excellent heat shrinkage but due to relatively large after-shrinkage (natural shrinkage) during storage of films and failure of adhesion with a solvent, which leads to difficulty in manufacturing a cylindrical product from a flat film, its applications are limited in some occasions.

Turning to heat shrinkable films, materials such as polyethylene, polypropylene, nylon, polyvinylidene chloride, vinyl chloride, polystyrene, polyethylene terephthalate, etc. have been used for preparing these films. However, a heat shrinkable film made of crystalline resins such as ethylene, polypropylene, nylon, etc. has a problem of large natural shrinkage. Whereas a heat shrinkable film of non-crystalline or substantially non-crystalline resin such as polyvinylidene chloride, vinyl chloride, polystyrene or polyethylene terephthalate has an advantage of a relatively small natural shrinkag, but due to its high density, involves problems that waste disposal costs increase and such a recycling process of separating a heat shrinkable film from a packaged material with water is not usable.

Furthermore, materials such as vinylidene chloride or vinyl chloride, etc. are concerned with generation of noxious gas during burning and polystyrene is suspected to be an environmental hormone.

Therefore, it has been desired to develop a heat shrinkable film that satisfies all requirements for a low natural shrinkage percentage, a high heat shrinkage percentage, a low density and hygiene.

DISCLOSURE OF THE INVENTION

The present invention provides an excellent molded article in view of impact property, adhesion property and printability.

The present invention provides a molded article, especially a heat shrinkable film, which has a low natural shrinkage percentage, a high shrinkage percentage upon heating and a low density and is excellent in a solvent resistance and hygiene.

The present invention provides a molded article comprising as the main components the ionomer (A), which is a metal salt of a copolymer containing an α-olefin unit and an unsaturated carboxylic acid unit, and the resin (B) having an alicyclic structure in its molecule.

The present invention provides a molded article formed of a composition comprising 1 to 99 wt % of the ionomer (A), which is a metal salt of a copolymer containing an α-olefin unit and an unsaturated carboxylic acid unit, and 99 to 1 wt % of the resin (B) having an alicyclic structure in its molecule.

The present invention provides a molded article that is a laminate comprising at least one layer containing the ionomer (A), which is a metal salt of a copolymer containing an α-olefin unit and an unsaturated carboxylic acid unit, having laminated thereon at least one layer containing the resin (B) having an alicyclic structure in its molecule.

The present invention provides a sheet or film as a preferred molded article. Preferred embodiments of the molded article include a stretched film and a heat shrinkable film.

The present invention enables to provide a heat shrinkable film having a low natural shrinkage percentage, a high shrinkage percentage upon heating and a low density, and having excellent solvent resistance and hygiene.

The present invention provides a composition comprising 1 to 99 wt % of the ionomer (A) and 99 to 1 wt % of the resin (B) having an alicyclic structure in its molecule, which enables to prepare an excellent molded article in view of impact property, adhesion property and printability as well as a heat shrinkable film having a low natural shrinkage percentage, a high shrinkage percentage upon heating and a low density, and having excellent solvent resistance and hygiene.

SPECIFIC EMBODIMENTS FOR CARRYING OUT THE INVENTION

Hereinafter the present invention is described more specifically.

According to the present invention, there is provided a molded article comprising as the main components the ionomer (A), which is a metal salt of a copolymer containing an α-olefin unit and an unsaturated carboxylic acid unit, and the resin (B) having an alicyclic structure in its molecule.

One preferred embodiment of the molded article according to the present invention is a molded article formed of a composition comprising 1 to 99 wt % of the ionomer (A), which is a metal salt of a copolymer containing an α-olefin unit and an unsaturated carboxylic acid unit, and 99 to 1 wt % of the resin (B) having an alicyclic structure in its molecule.

Another preferred embodiment of the molded article according to the present invention is the laminate comprising at least one layer containing the ionomer (A), which is a metal salt of a copolymer containing an α-olefin unit and an unsaturated carboxylic acid unit, having laminated thereon at least one layer containing the resin (B) having an alicyclic structure in its molecule.

According to the present invention, there is provided a composition comprising 1 to 99 wt % of the ionomer (A) and 99 to 1 wt % of the resin (B) having an alicyclic structure in its molecule, which enables to prepare an excellent molded article of the present invention.

These constituents are explained below in more detail.

Ionomer (A)

The ionomer (A) of the present invention is a metal salt of a copolymer containing an α-olefin unit and an unsaturated carboxylic acid unit. Examples of the α-olefin include an α-olefin having 2 to 20 carbon atoms, such as ethylene, propylene, 1-butene, 1-pentene, 3-methyl-1-butene, 4-methyl-1-pentene, 1-hexene, 1-heptene, 1-octene, 1-nonene, 1-decene, 1-undecene, 1-dodecene, etc. Among them, preferred examples of the α-olefin are those having 2 to 4 carbon atoms such as ethylene, propylene, 1-butene, etc., with ethylene being more preferred.

Examples of the unsaturated carboxylic acid include an unsaturated carboxylic acid such as acrylic acid, methacrylic acid, maleic acid, fumaric acid, tetrahydrophthalic acid, itaconic acid, citraconic acid, crotonic acid, endo-cis-bicyclo[2.2.1]hept-5-ene-2,3-dicarboxilic acid, etc. In addition, the unsaturated carboxylic acid may be in the form of its anhydride, more specifically, maleic anhydride, citraconic anhydride, etc. In these unsaturated carboxylic acids, preferred examples are acrylic acid and methacrylic acid.

As the copolymer containing an α-olefin unit and an unsaturated carboxylic acid unit according to the present invention, a copolymer obtained by copolymerizing the α-olefin and the unsaturated carboxylic acid described above is preferably employed. In this case, a content of the unsaturated carboxylic acid in the copolymer is generally from 1 to 50 wt %, preferably 1 to 20 wt %.

The copolymer containing an α-olefin unit and an unsaturated carboxylic acid unit according to the present invention may further contain other monomer units, in addition to the α-olefin unit and the unsaturated carboxylic acid. An example of the monomer units that can be incorporated in the copolymer includes an unsaturated carboxylic acid ester unit.

Examples of the unsaturated carboxylic acid ester unit are methyl acrylate, ethyl acrylate, butyl acrylate, methyl methacrylate, ethyl methacrylate, isobutyl methacrylate, diethyl maleate, etc.

The amount of the unsaturated carboxylic acid ester unit that can be incorporated in the copolymer containing the α-olefin unit and the unsaturated carboxylic acid unit is from 0 to 50% by weight, preferably 0 to 45% by weight.

In addition to the unsaturated carboxylic acid esters, any monomer can be incorporated in the copolymer containing the α-olefin unit and the unsaturated carboxylic acid, and there is no particular limitation to the monomer to be incorporated, unless it damages the property of the ionomer (A).

The α-olefin unit can be copolymerized with the unsaturated carboxylic acid and, if necessary, further with other monomers in a conventional manner.

The ionomer (A), which is a metal salt of the copolymer containing the α-olefin unit and the unsaturated carboxylic acid unit, is a metal salt in the copolymer containing the α-olefin unit and the unsaturated carboxylic acid unit described above. In the copolymer, a part or all of the carboxylic acid group is in the form of a salt with a metal ion.

Examples of the metal capable of forming a salt are at least one metal selected from alkali metals of Group Ia, alkaline earth metals of Group IIa and zinc group metals of Group IIb in the Periodic Table. Specific examples of these metals include alkali metals such as lithium, sodium, potassium, etc.; alkaline earth metals such as magnesium, etc., and zinc group metals such as zinc. Of these metals, sodium and zinc are preferably employed.

These metals may be used solely or in combination of two or more.

Specific examples of the ionomer (A) that can be preferably used in the present invention are sodium and/or zinc salts of the copolymer of ethylene and methacrylic acid and/or acrylic acid.

The metal salt of the copolymer containing the α-olefin unit and the unsaturated carboxylic acid unit can be prepared generally by reacting with a metal compound capable of neutralizing the copolymer, e.g., an oxide, a hydroxide, a carbonate, a bicarbonate, an aliphatic acid salt, etc. The level of neutralization is normally from 10% to 100%, preferably 20% to 100%.

The ionomer (A) of the present invention may also be obtained by saponification of an α-olefin-unsaturated carboxylic acid ester copolymer with an alkali.

The thus obtained ionomer (A), which is the metal salt of the copolymer containing the α-olefin unit and the unsaturated carboxylic acid unit, has a density of 0.900 to 0.980 g/cm$^3$, preferably 0.920 to 0.970 g/cm$^3$, a number average molecular weight Mn of 1,000 to 1,000,000, preferably 10,000 to 50,000, and a melting point of 70 to 150° C., preferably 80 to 130° C.

The ionomer (A) may be appropriately chosen from ionomers commercially available. Examples of such ionomers are Surlyn™ available from Du Pont, Himilan™ from Du Pont-Mitsui Polychemicals Co., Ltd. and Iotek™ from Exxon Mobile Corp.

Resin (B) having an alicyclic structure in its molecule

The resin (B) having an alicyclic structure in its molecule has a cyclic structure of carbon—carbon saturated bond (alicyclic structure). A resin may be used by appropriately choosing from such a resin, and preferred examples of such a resin are listed below:

(a) an addition copolymer of an α-olefin and a cyclic olefin;

(b) a ring-opened polymer of a cyclic olefin and its hydrogenated products;

(c) a vinyl-alicyclic hydrocarbon-based polymer;

(d) a hydrogenated vinyl-aromatic hydrocarbon-based polymer; and, (e) a monocyclic mono-olefinic compound polymer or its hydrogenated products.

Hereinafter, (a) through (e) above are described in more detail.

(a) The addition copolymer of an α-olefin and a cyclic olefin

The addition copolymer of an α-olefin and a cyclic olefin of the present invention is a copolymer mainly composed of an α-olefin-derived recurring unit and a cyclic olefin-derived recurring unit. These copolymers may be prepared, e.g., by subjecting an α-olefin and a cyclic olefin to addition copolymerization.

The α-olefin of the present invention may be linear or branched and preferably is an α-olefin having 2 to 20 carbon atoms. Specific examples include a linear α-olefin having 2 to 20 carbon atoms, such as ethylene, propylene, 1-butene, 1-pentene, 1-hexene, 1-octene, 1-decene, 1-dodecene, 1-tetradecene, 1-hexadecene, 1-octadecene, 1-eicosene, etc., and a branched α-olefin having 4 to 20 carbon atoms such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, etc. Among them, linear α-olefins having 2 to 4 carbon atoms are preferred, and ethylene is particularly preferred.

These linear or branched α-olefins may be used solely or in combination of two or more.

Representative examples of the present invention are compounds shown by the following formula (I) or (II).

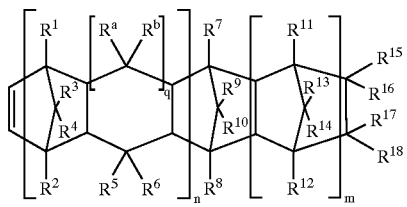

(I)

In the formula (I) above, n is 0 or 1, m is 0 or an integer of 1 or more, q is 0 or 1, provided that when q is 1, each of $R^a$ and $R^b$ independently represents an atom or a hydrocarbon group shown below, and when q is 0, there is no bond between $R^a$ and $R^b$ but the carbon atoms on the both ends are combined together to form a 5-membered ring.

Each of $R^1$ through $R^{18}$ and $R^a$ and $R^b$ independently represents hydrogen atom, a halogen atom, a hydrocarbon group, an ester group, cyano group or carboxyl group.

Herein, the halogen atom is a fluorine, chlorine, bromine or iodine atom.

Each of the hydrocarbon groups above independently represents an alkyl group having 1 to 20 carbon atoms, a cycloalkyl group having 3 to 15 carbon atoms, and an aromatic hydrocarbon group. More specifically, examples of the alkyl group include methyl, ethyl, propyl, isopropyl, amyl, hexyl, octyl, decyl, dodecyl and octadecyl; an example of the cycloalkyl group is cyclohexyl; and examples of the aromatic hydrocarbon group are phenyl and naphthyl. In these hydrocarbon groups, the hydrogen atom(s) may be substituted with a halogen atom(s).

Examples of the ester group include alkyl esters of a carboxylic acid, e.g., methyl, ethyl, propyl, n-butyl and isobutyl esters, etc.

In the formula (I) above, each of $R^{15}$ through $R^{18}$ may be combined together (combined to one another) to form a monocyclic or polycyclic ring. The thus formed monocyclic or polycyclic ring may contain a double bond(s). Specific examples of the monocyclic or polycyclic ring formed are shown below.

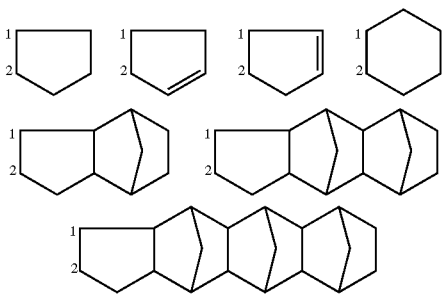

In the examples above, the carbon atom marked with numeral 1 or 2 designates the carbon atom, to which $R^{15}$ ($R^{16}$) or $R^{17}$ ($R^{18}$) is bound in the formula (I), respectively. Alternatively, $R^{15}$ and $R^{16}$ or $R^{17}$ and $R^{18}$ may be combined together to form an alkylidene group, respectively. Such an alkylidene group normally has carbon atoms of 2 to 20. Specific examples of the alkylidene group are ethylidene, propylidene and isopropylidene.

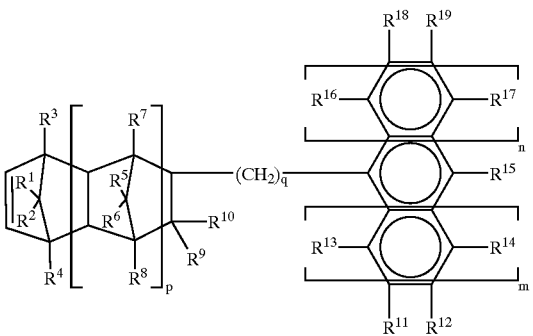

(II)

In the formula (II) above, p and q are 0 or an integer of at least 1; m and n are 0, 1 or 2; and each of $R^1$ through $R^{19}$ independently represents hydrogen atom, a halogen atom, a hydrocarbon group or an alkoxy group.

The halogen atom has the same significance as defined for the halogen atom in the formula (I) described above.

Each of the hydrocarbon groups independently represents an alkyl group having 1 to 20 carbon atoms, a halogenated alkyl group having 1 to 20 carbon atoms, a cycloalkyl group having 3 to 15 carbon atoms, or an aromatic hydrocarbon group.

More specifically, examples of the alkyl group include methyl, ethyl, propyl, isopropyl, amyl, hexyl, octyl, decyl, dodecyl and octadecyl; an example of the cycloalkyl group is cyclohexyl; and examples of the aromatic hydrocarbon group include an aryl group and an aralkyl group, more specifically, phenyl, tolyl, naphthyl, benzyl and phenylethyl.

Examples of the alkoxy group are methoxy, ethoxy, propoxy, etc. These hydrocarbon and alkoxy groups may be substituted with fluorine, chlorine, bromine or iodine atom(s).

Herein, the carbon atom to which $R^9$ and $R^{10}$ are bound may be bound to the carbon atom to which $R^{13}$ is bound or to the carbon atom to which $R^{11}$ is bound, either directly or via an alkylene group having 1 to 3 carbon atoms. That is, in the event that the two carbon atoms described above are bound via the alkylene group, the group shown by $R^9$ and $R^{13}$, or the group shown by $R^{10}$ and $R^{11}$ are combined together to form either one of the alkylene group of methylene group (—$CH_2$—), ethylene group (—$CH_2CH_2$—) or propylene group (—$CH_2CH_2CH_2$—).

Further in the event that n and m are both 0, $R^{15}$ and $R^{12}$, or $R^{15}$ and $R^{19}$ may be combined together to form a monocyclic or polycyclic aromatic ring. In this case, examples of the monocyclic or polycyclic aromatic ring include groups below, wherein $R^{15}$ and $R^{12}$ may further form an aromatic ring.

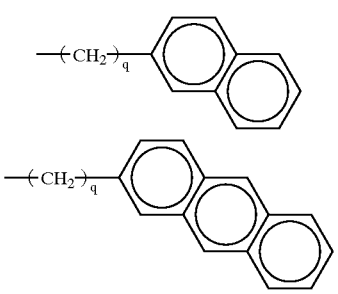

-continued

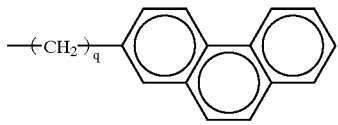

wherein q has the same significance as defined for q in formula (II).

The cyclic olefins represented by the formula (I) or (II) above are described below in more detail. An example includes bicyclo[2.2.1]-2-heptene (also termed norbornene; numerals 1 through 7 in the formula above denotes the position of carbon atoms) shown by:

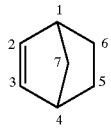

and derivatives of the compound in which a hydrocarbon group has been substituted.

Examples of the substituted hydrocarbon group include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(β-naphthyl), 5-(α-naphthyl), 5-(anthracenyl) and 5,6-diphenyl.

As the other derivatives there are bicyclo[2.2.1]-2-heptene derivatives such as cyclopentadiene-acenaphthylene adduct, 1,4-methano-1,4,4a,9a-tetrahydrofluorene, 1,4-methano-1,4,4a,5,10,10a-hexahydroanthracene, etc.

Further examples of the other derivatives include a tricyclo[4.3.0.1$^{2,5}$]-3-decene derivative such as tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene, etc.; a tricyclo[4.4.0.1$^{2,5}$]-3-undecene derivative such as tricyclo[4.4.0.1$^{2,5}$]-3-undecene, 10-methyltricyclo[4.4.0.1$^{2,5}$]-3-undecene, etc.; tetracyclo[4.4.0.1$^{2,5}$1.$^{7,10}$]-3-dodecene shown by the following formula:

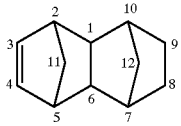

(hereinafter merely referred to as tetracyclododecene; in the formula above, numerals 1 through 12 denote the positions of carbon atoms) and its derivatives obtained by substituting a hydrocarbon group(s) on the dodecene.

Specific examples of the hydrocarbon group as the substituent include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenyl), 8-(β-naphthyl), 8-(α-naphthyl), 8-(anthracenyl) and 5,6-diphenyl.

As the other derivatives, there are adducts of (cyclopentadiene-acenaphthylene adduct) and cyclopentadiene.

Further examples include a tetracyclo[4.4.0.1$^{2,5}$.1$^{7,10}$]-3-dodecene derivative, pentacyclo[6.5.1.1$^{3,6}$.0$^{2,7}$.0$^{9,13}$]-4-pentadecene and its derivatives, pentacyclo[7.4.0.1$^{2,5}$.1$^{9,12}$.0$^{8,13}$]-3-pentadecene and its derivatives, pentacyclo[6.5.1.1$^{3,6}$.0$^{2,7}$.0$^{9,13}$]-4,10-pentadecadiene and its derivatives, pentacyclo[8.4.0.1$^{2,5}$.1$^{9,12}$.0$^{8,13}$]-3-hexadecene and its derivatives, pentacyclo[6.6.1.1$^{3,6}$.0$^{2,7}$.0$^{9,14}$]-4-hexadecene and its derivatives, hexacyclo[6.6.1.1$^{3,6}$.1$^{10,13}$.0$^{2,7}$.0$^{9,14}$]-4-heptadecene and its derivatives, heptacyclo[8.7.0.1$^{2,9}$.1$^{4,7}$.1$^{11,17}$.0$^{3,8}$.0$^{12,16}$]-5-eicosene and its derivatives, heptacyclo[8.7.0.1$^{3,6}$.1$^{10,17}$.1$^{12,15}$.0$^{2,7}$.0$^{11,16}$]-4-eicosene and its derivatives, heptacyclo[8.8.0.1$^{2,9}$.1$^{4,7}$.1$^{11,18}$.0$^{3,8}$.0$^{12,17}$]-5-heneicosene and its derivatives, octacyclo[8.8.0.1$^{2,9}$.1$^{4,7}$.1$^{11,18}$.1$^{13,16}$.0$^{3,8}$.0$^{12,17}$]-5-docosene and its derivatives, nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and its derivatives, nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene and its derivatives, etc.

Specific examples of the cyclic olefins shown by formula (I) or (II) above, which can be employed in the present invention, are described above. The structures of these compounds are shown in paragraphs [0032] through [0054] in Japanese Laid-Open Patent Publication No. 7-145213 more specifically, and those specifically listed in the Laid-Open specification may be used as the cyclic olefins also in the present invention.

The cyclic olefins shown by formula (I) or (II) above may be prepared by, e.g., a Diels-Alder reaction between cyclopentadine and olefins having the corresponding structure.

These cyclic olefins may be employed solely or in combination of two or more.

The cyclic olefin polymers used in the present invention may be prepared using the cyclic olefins of formula (I) or (II) described above, e.g., by the processes disclosed in Japanese Laid-Open Patent Publication Nos. 60-168708, 61-120816, 61-115912, 61-115916, 61-271308, 61-272216, 62-252406 and 62-252407, in which reaction conditions are appropriately chosen.

The addition copolymers (a) of α-olefins having 2 to 20 carbon atoms and cyclic olefins contain the α-olefin-derived constituent units generally in amounts of 5 to 95% by mol, preferably 20 to 80% by mol, and constituent units from the cyclic olefins generally in amounts of 5 to 95% by mol, preferably 20 to 80% by mol. The ratio of the α-olefin to the cyclic olefin in the composition is determined by $^{13}$C-NMR.

In the α-olefin-cyclic olefin addition copolymer (a), the constituent units from the α-olefin having 2 to 20 carbon atoms and the constituent units from the cyclic olefin are arranged at random and bound to form substantially a linear structure. The copolymer is substantially of a linear structure and substantially free of a gel like cross-linking structure. This can be confirmed by the absence of any insoluble matter in a solution when the copolymer is dissolved in an organic solvent. For example, it can be confirmed by the fact that the copolymer is completely dissolved in decalin at 135° C., when the intrinsic viscosity [η] is measured.

In the α-olefin-cyclic olefin addition copolymer (a) used in the present invention, it is believed that at least a part of the cyclic olefin represented by formula (I) or (II) above would constitute the following recurring unit shown by formula (III) or (IV) below.

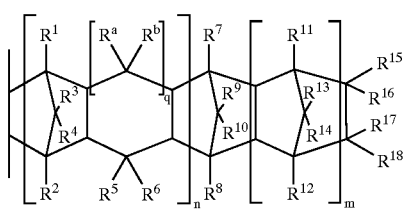

(III)

In formula (III) above, n, m, q, $R^1$ through $R^{18}$ and $R^a$ and $R^b$ have the same significance as defined in formula (I).

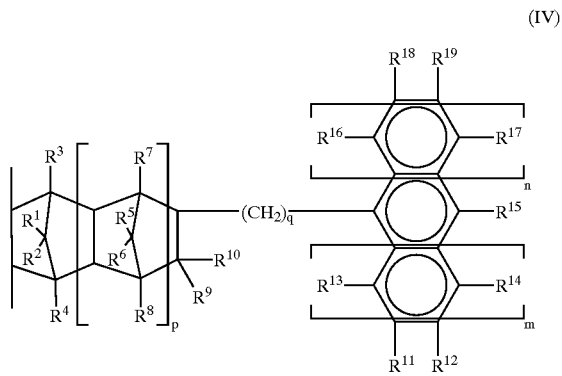

(IV)

In formula (IV) above, n, m, p, q and $R^1$ through $R^{19}$ have the same significance as defined in formula (II).

The α-olefin-cyclic olefin addition copolymer (a) employed in the present invention may contain constituent units from other copolymerizable monomers, if necessary and desired, in such an amount that does not damage the objects of the present invention.

As the other monomers of such purpose there are olefins other than the α-olefin having 2 to 20 carbon atoms and the cyclic olefins described above. Specific examples of these monomers include cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene, etc.; and non-conjugated dienes such as 1,4-hexadiene, 4-methyl-1,4-hexadiene, 5-methyl-1,4-hexadiene, 1,7-octadiene, dicyclopentadiene and 5-vinyl-2-norbornene; etc.

These other monomers may be used solely or in combination.

When the constituent units derived from the other monomers described above is incorporated in the α-olefin-cyclic olefin addition copolymer (a), the amount of the other monomer may be normally in an amount of not more than 20% by mol, preferably not more than 10% by mol.

The α-olefin-cyclic olefin addition copolymer (a), which is used in the present invention, can be prepared by the processes disclosed in the Laid-Open specifications supra, using the α-olefin having 2 to 20 carbon atoms and the cyclic olefin of formula (I) or (II). Among these processes, preferred is the process comprising copolymerization in a hydrocarbon solvent using a catalyst made up from a vanadium compound soluble in the hydrocarbon solvent and an organoaluminum compound.

In the copolymerization, a metallocene-based solid catalyst of Group IV in the Periodic Table may also be used. The metallocene-based solid catalyst of Group IV is a catalyst comprising a transition metal compound containing a ligand having a cyclopentadienyl structure and an organic aluminum oxy compound and, if necessary, an additional organoaluminum compound. Examples of the transition metal of Group IV in the Periodic Table include zirconium, titanium and hafnium. These transition metals each has at least one ligand containing cyclopentadienyl structure in the catalyst. Examples of the cyclopentadienyl structure-containing ligand include a cyclopentadienyl group which may optionally be substituted with an alkyl group, indenyl group, tetrahydroindenyl group and fluorenyl group. These groups may be bound each other via other groups such as an alkylene group. Examples of ligands other than the cyclopentadienyl structure-containing ligands are an alkyl group, a cycloalkyl group, an aryl group and an aralkyl group.

As the organic aluminum oxy compound and the organoaluminum compound, there may be employed those conventionally used for the preparation of polyolefins. The Group IV metallocene-based solid catalysts described in, e.g., Japanese Laid-Open Patent Publication Nos. 61-221206, 64-106 and 2-173112 may be used for the present invention.

(b) The ring-opened polymer of a cyclic olefin and its hydrogenated products

The ring-opened polymer of a cyclic olefin is a ring-opened polymer of cyclic olefin shown by formula (I) or (II) described above, or a copolymer containing ring-opened polymer units from the cyclic olefin shown by formula (III) or (IV) described above. In the case of the copolymer, two or more different cyclic olefins are used in combination.

In the ring-opened polymer or copolymer of the cyclic olefin (b), it is believed that at least a part of the cyclic olefin shown by formula (I) or (II) above would make up a recurrent unit represented by formula (V) or (VI) below.

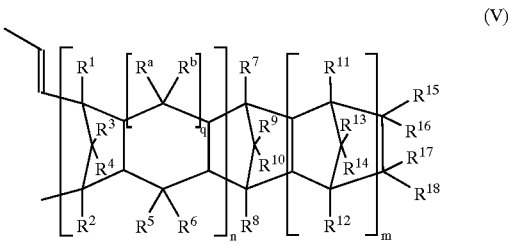

(V)

In the formula (V) above, n, m, q, $R^1$ through $R^{18}$ and $R^a$ and $R^b$ have the same significance as defined in formula (I).

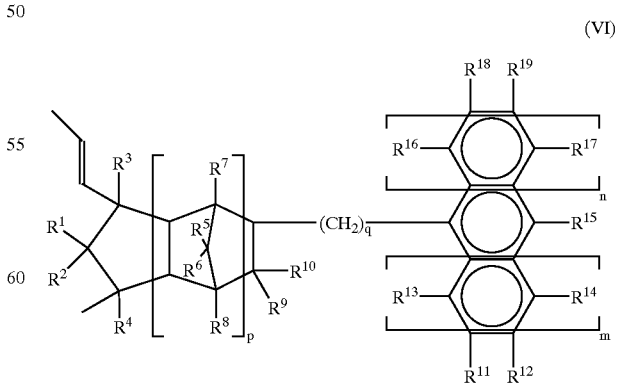

(VI)

In the formula (VI) above, n, m, p, q and $R^1$ through $R^{19}$ have the same significance as defined in formula (II).

The ring-opened polymer or copolymer may be prepared by the processes disclosed in the Japanese Laid-Open Patent specifications supra. For example, the polymer or copolymer may be prepared by polymerizing or copolymerizing the cyclic olefin of formula (II) above in the presence of a ring opening polymerization catalyst. As the catalyst for ring opening polymerization, there may be employed a catalyst comprising the halide, nitrate or acetylacetone compound of a metal selected from ruthenium, rhodium, palladium, osmium, indium, platinum, etc. and a reducing agent; or a catalyst comprising the halide or acetylacetone compound of a metal selected from titanium, palladium, zirconium and molybdenum and an organoaluminum compound.

The hydrogenated ring-opened polymer is prepared by hydrogenation of the ring-opened polymer or copolymer obtained described above in the presence of a known hydrogenation catalyst.

In the hydrogenated ring-opened polymer or copolymer, it is believed that at least a part of the cyclic olefin shown by formula (I) or (II) above would make up a recurrent unit represented by formula (VII) or (VIII) below.

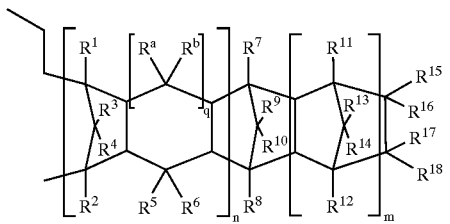

(VII)

In the formula (VII) above, n, m, q, $R^1$ through $R^{18}$ and $R^a$ and $R^b$ have the same significance as defined in formula (I).

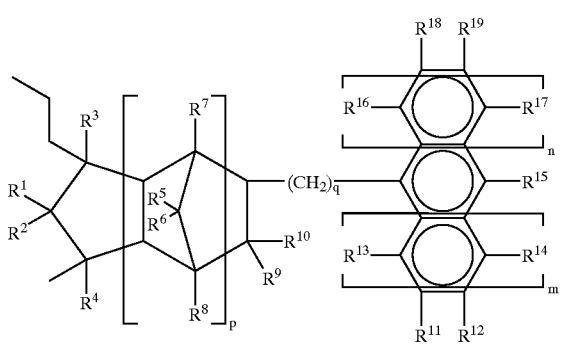

(VIII)

In the formula (VIII) above, n, m, p, q and $R^1$ through $R^{19}$ have the same significance as defined in formula (II).

The ethylene-cyclic olefin random copolymer (a) and the cyclic olefin ring-opened copolymer or its hydrogenated products (b) may be graft modified.

A graft modifier used is generally an unsaturated carboxylic acid. Specific examples of the modifier include an unsaturated carboxylic acid such as (meth)acrylic acid, maleic acid, fumaric acid, tetrahydrophthalic acid, itaconic acid, citraconic acid, crotonic acid, isocrotonic acid, endo-cis-bicyclo[2.2.1]hept-5-ene-2,3-dicarboxilic acid (Nadic Acid™), etc.; and derivatives of these unsaturated carboxylic acids such as an unsaturated carboxylic acid anhydride, an unsaturated carboxylic acid halide, an unsaturated carboxylic acid amide, an unsaturated carboxylic acid imide, an unsaturated carboxylic acid ester, etc.

Specific examples of the unsaturated carboxylic acid derivatives include maleic anhydride, citraconic anhydride, maleyl chloride, maleimide, monomethyl maleate, dimethyl maleate, glycidyl maleate, etc.

Of these modifiers, preferably employed are an α,β-unsaturated dicarboxylic acid and an α,β-unsaturated dicarboxylic acid anhydride such as maleic acid, Nadic Acid™ and acid anhydrides of these acids. These modifiers may also be used in combination of two or more.

The graft modified product of the cyclic olefin polymer may be prepared by graft polymerization of the cyclic olefin polymer in the presence of such a modifier incorporated to achieve a desired modification level. Alternatively, a highly graft modified product may be prepared previously and the resulting product is blended with an unmodified cyclic olefin polymer so as to obtain the graft modified compound of a desired modification level.

For preparing the graft modified cyclic olefin polymer from the cyclic olefin polymer and the graft modifier, a variety of conventional methods for graft modification may apply to the present invention. For example, the graft modified polymer may be prepared through a method for graft polymerization (reaction) by adding a modifier to the cyclic olefin polymer in a melt state, or a method for graft reaction by adding a modifier to a solution of the cyclic olefin polymer in a solvent.

Such a graft reaction is carried out generally at a temperature of 60 to 350° C. The graft reaction may be performed in the presence of a radical initiator such as an organic peroxide or an azo compound.

(c) The vinyl-alicyclic hydrocarbon-based polymer

A vinyl-alicyclic hydrocarbon compound, which is a monomer of the vinyl-alicyclic hydrocarbon-based polymer (c), is a compound having a structure wherein a cycloalkyl group, an alkyl-substituted cycloalkyl group, a cycloalkenyl group or an alkyl-substituted cycloalkenyl group, which is monocyclic, has been bound to vinyl group or α-alkyl-substituted vinyl group.

Examples of such compounds include vinylcyclobutane, vinylcyclopentane, vinylcyclohexane, vinylcycloheptane, vinylcyclooctane, and these compounds wherein the α-position of vinyl has been substituted with an alkyl group such as methyl, ethyl, propyl, etc. Further examples include vinylcyclohexene derivatives such as 4-vinylcyclohexene, 4-isopropenylhexene, 1-methyl-4-vinylcyclohexene, 1-methyl-4-isopropenylcyclohexene, 2-methyl-4-vinylcyclohexene, 2-methyl-4-isopropenylhexene, etc.

The compounds described above may be polymerized singly or may be copolymerized in combination of two or more. Furthermore, the compounds above may also be copolymerized with other copolymerizable monomers in such an amount that does not damage the objects of the present invention.

Examples of the other monomers copolymerizable with the vinyl-alicyclic hydrocarbon compounds are propylene, butene, acrylonitrile, acrylic acid, methacrylic acid, maleic anhydride, an acrylic acid ester, a methacrylic acid ester, maleimide, vinyl acetate, vinyl chloride, etc. Among them, α-olefins are preferably employed. Particularly the use in combination with monomers such as propylene or butene is preferable since softness or impact resistance can be imparted.

Desirably, the other monomers copolymerizable with the vinyl-alicyclic hydrocarbon compounds may be used in an amount of 0 to 95% by mol, preferably 0 to 90% by mol, based on the total amount of the monomers.

To produce the vinyl-alicyclic hydrocarbon-based polymer (c), any polymerization method may be used without limitation, and known radical polymerization, coordination anionic polymerization (Ziegler polymerization), cationic polymerization, anionic polymerization, etc. may be applicable.

(d) The hydrogenated vinyl-aromatic hydrocarbon-based polymer

A vinyl-aromatic hydrocarbon compound, which is a monomer of the vinyl-aromatic hydrocarbon-based polymer, is a compound having a structure wherein an aromatic hydrocarbon substituent has been bound to vinyl group or a-alkyl-substituted vinyl group.

Examples of such compounds include styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, 4-phenylstyrene, vinylnaphthalene, vinylanthracene, etc.

The compounds described above may be polymerized singly or may be copolymerized in combination of two or more. Furthermore, the compounds above may also be copolymerized with other copolymerizable monomers in such an amount that does not damage the objects of the present invention.

Examples of the other monomers copolymerizable with the vinyl-alicyclic hydrocarbon compounds are propylene, butene, acrylonitrile, acrylic acid, methacrylic acid, maleic anhydride, an acrylic acid ester, a methacrylic acid ester, maleimide, vinyl acetate, vinyl chloride, etc. Among them, α-olefins are preferably employed. Particularly the use in combination with monomers such as propylene or butene is preferable since softness or impact resistance can be imparted.

It is desirable to employ the other monomers copolymerizable with the vinyl-alicyclic hydrocarbon compounds in an amount of 0 to 95% by mol, preferably 0 to 90% by mol, based on the total amount of the monomers.

The same polymerization methods as described for (c) above may be applicable.

The polymers thus obtained may be hydrogenated on the aromatic ring by known methods to prepare the desired hydrogenated vinyl-aromatic hydrocarbon-based polymers (d). Conventionally known methods may be applied to the hydrogenation, and examples include Japanese Laid-Open Patent Publication No. 7-247321, U.S. Pat. No. 5,612,422, etc. The hydrogenation percentage on the aromatic ring of the polymer is not less than 30%, preferably not less than 60%, and more preferably not less than 90% (as determined by NMR).

(e) The monocyclic conjugated diene polymer or its hydrogenated products

A monocyclic conjugated diene compound, which is a monomer for the monocyclic conjugated diene polymer or its hydrogenated products (e), is a monocyclic conjugated diene that may optionally be substituted. Examples of the monomer include cyclopentadiene, cyclohexadiene, cycloheptadiene, cyclooctadiene, etc.

The compounds described above may be polymerized singly or may be copolymerized in combination of two or more. Furthermore, the compounds above may also be copolymerized with other copolymerizable monomers in such an amount that does not damage the objects of the present invention.

Examples of the other monomers copolymerizable with the vinyl monocyclic conjugated dienes are ethylene, propylene, butene, acrylonitrile, acrylic acid, methacrylic acid, maleic anhydride, an acrylic acid ester, a methacrylic acid ester, maleimide, vinyl acetate, vinyl chloride, etc.

It is desirable that the other monomers copolymerizable with the monocyclic conjugated dienes may be used in an amount of 0 to 95% by mol, preferably 0 to 90% by mol, based on the total amount of the monomers.

No particular restriction is imposed upon the polymerization but known methods for polymerization may be applicable.

The polymers thus obtained may be hydrogenated by known methods to prepare the desired monocyclic conjugated diene-based polymers or hydrogenated products thereof (e). Specifically, e.g., polycyclohexadiene and its hydrogenated products may be obtained by the method disclosed in Japanese Laid-Open Patent Publication No. 11-106571.

The hydrogenation percentage on the double bond of the hydrocarbon ring contained in the (co)polymer is not less than 30%, preferably not less than 60%, and more preferably not less than 90% (as determined by NMR).

The weight-average molecular weight (Mw) of the resin (B) having the alicyclic structure in its molecule, which is used in the present invention, is 5,000 to 1,000,000, preferably 10,000 to 500,000, and more preferably 50,000 to 300,000 in terms of polystyrene by gel permeation chromatography (GPC), when converted using a standard polystyrene sample as reference. Also, the molecular distribution (Mw/Mn; Mn is a number-average molecular weight as determined by GPC) is not more than 10, preferably not more than 5.0, more preferably not more than 3.0.

The density is not more than 1.5 g/cm$^3$, preferably not more than 1.1 g/cm$^3$, more preferably not more than 0.98 g/cm$^3$, and most preferably not more than 0.95 g/cm$^3$.

The crystallization degree is not more than 20%, preferably not more than 10%, and more preferably not more than 5%.

The glass transition temperature (Tg; as measured by DSC) is between 50 and 300° C., more preferably between 60 and 280° C., and most preferably between 70 and 250° C.

The glass transition temperature may be controlled by adding a plasticizer. For the purpose of controlling the glass transition temperature of the polymer above, any compounds that can be added to the polymer to lower the glass transition temperature are all usable without limitation. Examples of such compounds are liquid paraffin, spindle oil, processed oil such as naphthene type oil, terpene type compounds such as squalane or limonene, etc.

The resin (A) and/or (B) of the present invention may further contain resins and additives, provided that the objects of the invention is not marred. Examples of such resins and additives include rubber components, other resin components, heat stabilizers, weathering stabilizers, light fastness agents; known heat stabilizers, weathering (light fastness) stabilizers, anti-slip agents, anti-blocking agents, antistatic agents, nucleating agents, petroleum resins, thermoplastic resins, thermosetting resins, etc.

Molded Article

The molded article in accordance with the present invention comprises as the main components the ionomer (A) described above and the resin (B) having the alicyclic structure in its molecule.

The molded article of the present invention can be obtained by molding a composition comprising the ionomer (A) and the resin (B) having the alicyclic structure in its molecule.

The molded article of the present invention may take the form of the laminate comprising a layer containing the ionomer (A) and a layer containing the resin (B) having the alicyclic structure in its molecule.

Composition

The present invention provides a composition comprising the ionomer (A) described above and the resin (B) having the alicyclic structure in its molecule.

Preferably, the total amount of the ionomer (A) and the resin (B) having the alicyclic structure in its molecule constitutes a predominant proportion in the composition comprising the ionomer (A) and the resin (B) having the alicyclic structure in its molecule.

A preferred embodiment of the composition comprising the ionomer (A) and the resin (B) having the alicyclic structure in its molecule comprises 1 to 99 parts by weight, preferably 10 to 80% by weight of the ionomer (A), and 99 to 1 part by weight, preferably 80 to 20% by weight of the resin (B) having the alicyclic structure in its molecule.

It is desired for the composition according to the present invention to have a melt flow rate (MFR) of normally 0.01 to 100 g/10 mins., preferably 1.0 to 50 g/10 mins., as measured at 260° C. under a load of 2.16 kg.

It is preferred to have a density in the range of 0.91 to 1.40 g/cm$^3$, preferably 0.90 to 1.3 g/cm$^3$.

No particular restriction is imposed upon preparing the composition of the present invention comprising the ionomer (A) and the resin (B) having the alicyclic structure in its molecule. In general, the two components may be fusion-kneaded, if necessary, with other components. The two components (A) and (B) may be previously dissolved in a common solvent followed by crystallization to form the composition. The fusion kneading may be carried out using conventional known devices including a Banbury type mixer, rolls, etc.

The composition obtained may be used directly for intended use. Also, the composition may be further processed into pellets or veils with these fusion kneading devices, which are then supplied to a molding machine such as a film forming device, etc.

Molding of Composition

The composition of the present invention enables to prepare molded articles having excellent impact, adhesion and printability properties. Further by modifying the compositional ratio of the ionomer (A) to the resin (B) having the alicyclic structure in its molecule, it is possible to prepare a highly rigid composition to a soft composition. For its excellent properties, the composition is available in a variety of forms for various applications.

In preparing the molded articles, conventional known molding processes can be used. Specific examples of such methods for preparing molded articles include injection molding; extrusion molding methods such as T die extrusion molding, contour extrusion molding, pipe extrusion molding and inflation molding; direct blow molding, injection blow molding, monoaxial stretching, tubular stretching, serial or simultaneous biaxial stretching with a tenter, press molding rotational molding, melt spinning, solution spinning, melt blowing, casting, calendering, etc.

The injection molded articles, blow molded articles, compression molded articles, films or sheets, filaments, nonwoven fabrics, etc., which are obtained by these molding methods, are preferable molded articles of the present invention.

In these molded articles, the composition of the present invention provides remarkable effects especially for film application. No particular restriction is imposed upon preparing films, either, but conventional known methods can be used.

The molded article of the present invention in the form of films or sheets provides a preferred embodiment for the composition of the invention. Stretched films, which are prepared by stretching these films or sheets, also provide a preferred application for the composition of the invention. The stretched films are suitable as heat shrinkable films. The heat shrinkable film according to the present invention has a low natural shrinkage percentage, a high shrinkage percentage upon heating and a low density and is thus excellent in solvent resistance and hygiene.

A preferred example of the process for preparing the heat shrinkable film comprises stretching a film or sheet formed of the composition comprising 1 to 99 parts by weight, preferably 10 to 80% by weight of the ionomer (A) and 99 to 1 part by weight, preferably 80 to 20% by weight of the resin (B) having the alicyclic structure in its molecule.

Laminates

The molded article of the present invention can take the form of a laminate comprising a layer containing the ionomer (A) having laminated thereon a layer containing the resin (B) having the alicyclic structure in its molecule.

The layer containing ionomer (A) may be either a layer formed of the ionomer (A) or a layer containing the composition comprising the ionomer (A) in a dominant proportion and the resin (B) having the alicyclic structure in its molecule.

The layer containing the resin (B) having the alicyclic structure in its molecule may be either a layer formed of the resin (B) having the alicyclic structure in its molecule or a layer containing the composition comprising the resin (B) having the alicyclic structure in its molecule in a dominant proportion and the ionomer (A).

The laminate of the present invention formed of at least one layer containing ionomer (A)(Layer (A)) and at least one layer (Layer (B)) containing the resin (B) having the alicyclic structure in its molecule typically takes the laminate structure of a pair of Layer (A) and Layer (B). And the laminete may take a structure with a plurality of the pairs.

Also, the laminate film may take such a structure that Layers (B) are laminated on the both sides of Layer (A), or Layers (A) are laminated on the both sides of Layer (B). In this case, it is sufficient that the two outermost layers be formed by Layer (A) or Layer (B), and the inner layers may be formed by a plurality of Layer (A) and Layer (B). Specific examples of the laminated films described above include laminated films with layer configurations of Layer (A)/Layer (B)/Layer (A) and Layer (B)/Layer (A)/Layer (B).

In the laminate of the present invention, when the laminate has a plurality of Layers (A) or Layers (B), respectively, Layers (A) may have different compositions, and so may Layers (B).

Each of the layers may be laminated by conventional known methods. Specifically, there is applied a multilayer co-extrusion method using a T die extruder, an inflation molding device, etc.

In the event that the laminate molding is molded by the multilayer co-extrusion, Layer (A) and Layer (B) may be laminated directly; alternatively, an adhesive resin may be inserted between Layer (A) and Layer (B). As such an adhesive resin, a homopolymer or copolymer of an α-olefin having 2 to 20 carbon atoms, a copolymer of at least one of the α-olefin and a nonconjugated diene, and graft modified products of these polymers with unsaturated carboxylic acids, etc. are available.

Examples of such polymers are polyethylene, polypropylene, polybutene, poly-4-methylpentene-1, ethylene-propylene copolymer, ethylene-1-butene copolymer, ethylene-4-methylpentene-1 copolymer, ethylene-1-hexene copolymer, ethylene-octene copolymer, ethylene-propylene-ethylidenenorbornene copolymer, ethylene-1-butene-ethylidenenorbornene copolymer, ethylene-propylene-1,4-hexadiene copolymer, ethylene-1-butene-1,4-hexadiene copolymer, etc. The molecular weight of these polymers is in the range of 1,000 to 1,000,000, preferably 6,000 to 500,000, and the crystallization degree is in the range of 0 to 80%, preferably 0 to 50%.

For the graft modification, the same unsaturated carboxylic acid as described for the component of (A) is used, and graft modified using a radical initiator such as a known organic peroxide, an azo compound, etc.

These resins may further contain petroleium resin, an oligomer such as wax, liquid paraffin, an oil such as spindle oil, terpene type compounds such as squalane or limonene, etc.

Further examples of the lamination method of the respective layers include a method which comprises previously preparing films or sheets having the respective layers and then adhering them with an adhesive (dry lamination, wet lamination, non-solvent lamination, etc.), an extrusion lamination method which comprises coating a fused layer on a film or sheet forming another layer, and the like.

Heat Shrinkable Film

The heat shrinkable film in accordance with the present invention can be obtained by stretching the molded article, specifically the film or sheet, comprising as the main components the ionomer (A) described above and the resin (B) having the alicyclic structure in its molecule.

One preferred embodiment of the method for preparing the heat shrinkable film of the present invention comprises stretching the film or sheet formed of the composition comprising the ionomer (A) and the resin (B) having the alicyclic structure in its molecule.

Another preferred embodiment of the method for preparing the heat shrinkable film of the present invention comprises stretching the film or sheet formed of the laminate comprising the layer containing ionomer (A) having laminated thereon the layer containing the resin (B) having the alicyclic structure in its molecule.

Hereinafter the constitution of the heat shrinkable film of the present invention and the method for preparing the same are explained below, by referring to specific examples.

The first heat shrinkable film can be obtained by stretching the film or sheet formed of the composition comprising the ionomer (A) and the resin (B) having the alicyclic structure in its molecule.

A preferred example is the heat shrinkable film obtained by stretching a film or sheet composed of a composition comprising 1 to 99 parts by weight, preferably 10 to 80% by weight of the ionomer (A) and 99 to 1 part by weight, preferably 80 to 20% by weight of the resin (B) having the alicyclic structure in its molecule.

The heat shrinkable film prepared using the composition of the present invention has the properties that its natural shrinkage percentage is low, the shrinkage percentage upon heating is high and the density is low, and is thus excellent in solvent resistance and hygiene. In other words, the composition of the present invention enables to produce heat shrinkable films having excellent properties.

Since the film prepared by the casting or the T die method has not been stretched substantially, it is preferred to subject the film to monoaxial or biaxial stretching using a longitudinal monoaxial stretching device and/or a transverse monoaxial stretching device (tenter), simultaneous biaxial stretching device (tenter), etc. The stretching ratio may optionally be set forth depending upon use but generally is not less than 1.5 times, and preferably not less than 2 times.

The thickness of the film may optionally be varied depending on use but in general, is in the range of 5 to 500 μm, and preferably 10 to 250 μm.

The second heat shrinkable film in accordance with the present invention can be obtained by stretching the molded article, in particular, the film or sheet, formed by laminating at least one layer (Layer (A)) containing the ionomer (A) on at lest one layer (Layer (B)) containing the resin (B) having the alicyclic structure in its molecule.

The layer configuration of Layer (A) and Layer (B) has been explained above.

In preferred configurations of the heat shrinkable film, the film may take the configuration, in which Layers (B) are laminated on the both sides of Layer (A), or Layers (A) are laminated on the both sides of Layer (B). In this case, it is sufficient that the two outermost layers be formed by Layer (A) or Layer (B), and the inner layers may be formed by a plurality of Layer (A) and Layer (B). Specific preferred examples of such laminated films include laminated films with layer configurations of Layer (A)/Layer (B)/Layer (A) and Layer (B)/Layer (A)/Layer (B).

In the heat shrinkable film with the multilayered configuration described above, it can be designed that at least one layer be composed of the composition comprising 50 to 99% by weight of the ionomer (A) and 1 to 50% by weight of the resin (B) having the alicyclic structure in its molecule and on the resulting layer, a layer containing the resin (B) having the alicyclic structure in its molecule is laminated, thereby to improve adhesion between the layers.

Further in the heat shrinkable film with the multilayered configuration, it can be designed that at least one layer be composed of the composition comprising the resin (B) having the alicyclic structure in its molecule and not more than 50% by weight, preferably not more than 30% by weight of the ionomer (A), thereby to enhance adhesion between the layers.

Layer lamination may be carried out using conventional known methods. Specifically, the lamination methods described above can be used. The method and conditions for stretching are similar to those described above for the preparation of the first heat shrinkable film.

The heat shrinkable film of the present invention is characterized by the properties of a low natural shrinkage percentage, a high shrinkage percentage upon heating and a low density and by excellent solvent resistance and hygiene.

The heat shrinkable film of the invention can be favorably used by way of casings, pre-packaging of foodstuff, caps, shrinkable labels, cap seals, dry cell packaging, insulating packages of batteries, kitchen utensils, toiletries, pallets, packages for industrial materials, sleeve packaging, overwrap, trays, cups for instant food, packages for one-cup sake drink, packages for cakes, frozen or refrigerated foodstuff, etc.

The density of the heat shrinkable film of the present invention may be controlled to approximately 0.94 to 0.97 g/cm$^3$. Examples of such heat shrinkable films available for interesting use are given below.

Because of its excellent efficiencies, the heat shrinkable film of the present invention can be advantageously used as a wrapping film for drink bottles made of resins such as polyethylene terephthalate (PET). For example, when used PET bottles are pulverized to recover PET therefrom, precipitated PET and floating wrapping heat shrinkable film can be readily separated in water due to difference in specific gravity, which makes easy the recycling of PET bottles.

Reflecting ever-increasing concern for environmental problems in these days, a serious attention has been brought to the recycling of used resin containers, and the heat shrinkable film of the present invention provides commercial products that can cope with the requirements in view of environmental problems.

Further examples of the applications of the molded articles provided by the present invention include strip packaging, blister packaging, PTP, standing pouch, retort containers, cup-like containers for food, container caps, drinking bottles, containers for cosmetics, toplifts, golf ball skins, ski shoes, bumper covers, foamed articles, paper finishing materials, sizing agents, ceramic binders, toners for electrostatic copy, wall paper, films for agricultural use, lead hardeners for pencils and crayons, carbon ink base materials, releasing agents, release films for flexible printing substrates, transfusion bags, transfusion bottles, medical tubes, nonwoven fabrics, electrets, pampers, sanitary napkins, wrapping films for home use, separator films for cells, hot melt adhesive agents, shape memory resins, etc.

EXAMPLES

Hereinafter, the present invention is described in more detail, by referring to Example and Comparative Example but is not deemed to be limited to these Examples.

In the present invention, the properties were determined by the following methods.

Density:

The density was determined under the conditions given in ASTM D1505.

Tg, Melting Point:

These temperatures were measured under the temperature elevation rate of 10° C./min., using DSC.

Heat Shrinkage Percentage:

A test sample piece was cut out of the stretched film in a size of 15 mm×120 mm so that the long direction agreed with the stretched direction. The test sample piece was then heated at 80° C. for 5 minutes using an oven with internal air circulation. The shrinkage percentage was calculated according to the following equation.

Shrinkage percentage=(initial length of the test piece−length after shrinkage)×100/initial length of the test piece Natural Shrinkage Percentage:

After heat treatment at 40° C. for 7 days with an oven with internal air circulation, the natural shrinkage percentage was calculated according to the equation given above.

Bending Test:

Using a test piece of 5×½×1.8 inch, which was prepared by injection molding, the bending test was conducted by the method defined in ASTM D790 under the conditions of 51 mm in a span distance, 20 mm/min. in the maximum test speed and 23° C. of test temperature.

Tensile Test:

Using a test piece of TYPE IV prepared by injection molding, the tensile test was carried out by the method defined in ASTM D638 under the conditions of 23° C. and 5 mm/min. in a test speed.

Adhesion Strength:

On a 100 μm aluminum plate cut in a width of 15 mm and a length of 150 mm, films cut into the same width and length, which were formed of the compositions of EXAMPLE 1 and COMPARATIVE EXAMPLES 1 through 3, were put, followed by heat sealing under the conditions of 120° C. at a sealing temperature, a pressure of 0.2 MPa and a sealing time for 0.5 second. Then, peeling test followed by T peeling at a temperature of 23° C. and a test speed of 300 mm/min.

Solvent Resistance:

The surface of the test piece used for the bending test was wiped with hexane-impregnated cloth and then observed.

When the surface of the test piece was not changed, it was assessed by ○ and, by × when a change was observed on the surface.

Materials Used for Film Formation

EMNa:

Ethylene-methacrylic acid copolymer sodium salt having a density of 0.940 g/cm$^3$, MFR of 2.8 g/10 mins. as measured under the conditions of a temperature at 190° C. and a load of 1950 g, and a melting point of 92° C. (Himilan™ 1605 available from Du Pont-Mitsui Polychemicals Co., Ltd.)

ETCD:

Random copolymer of ethylene and tetracyclo[4.4.0.1$^{2,5}$1$^{7,10}$]-3-dodecene

EM:

Ethylene-methacrylic acid copolymer having a density of 0.930 g/cm$^3$, MFR of 9.0 g/10 mins. as measured under the conditions of a temperature at 190° C. and a load of 1950 g, and a melting point of 92° C. (Nucrel™ MJ903HC, available from Du Pont-Mitsui Polychemicals Co., Ltd.)

PE:

Linear low density polyethylene having a density of 0.915 g/cm$^3$ and MFR of 4.0 g/10 mins. as measured under the conditions of a temperature at 190° C. and a load of 1950 g

PP:

Propylene-ethylene random copolymer having an ethylene content of 4.5 mol %, MFR of 2.5 g/10 mins. as measured under the conditions of a temperature at 230° C. and a load of 2160 g, and a density of 0.90 g/cm$^3$.

Example 1

After 80 wt % of EMNa was blended with 20 wt % of ETCD, a film having a thickness of 180 μm was molded from the blend through a T die extruder, which cylinder temperature and the die were set at 220° C. From the film obtained, a film piece was cut out in a size of 13 cm×13 cm. After preheating at 80° C. for 2 minutes, the film piece was monoaxially stretched by 3 times toward the right angle direction (TD) against the extrusion direction, using a batch type stretching machine, to give a film having a thickness of 60 μm.

The properties of the film obtained are shown in TABLE 1.

Comparative Example 1

A film was molded in a manner similar to Example 1 except that EMNa was used in an amount of 100 wt % in EXAMPLE 1, otherwise all identical. The film was then monoaxially stretched to prepare a film having a thickness of 60 μm.

The properties of the film obtained are shown in TABLE 1.

Comparative Example 2

A film was molded in a manner similar to Example 1 except that ETCD was used in an amount of 100 wt % in Example 1, otherwise all identical. The film was then monoaxially stretched to prepare a film having a thickness of 60 μm.

The properties of the film obtained are shown in TABLE 1.

Comparative Example 3

A film was molded in a manner similar to Example 1 except that EM was used in place of EMNa in Example 1. The film was then monoaxially stretched to prepare a film having a thickness of 60 μm.

The properties of the film obtained are shown in TABLE 1.

TABLE 1

| | | Ex. 1 | Com. Ex. 1 | Com. Ex. 2 | Com. Ex. 3 |
|---|---|---|---|---|---|
| Constitution of film | | | | | |
| Kind of film | | Single layer | Single layer | Single layer | Single layer |
| Thickness of film after stretching (μm) | | 60 | 60 | 60 | 60 |
| Composition of single layer film (wt %) | EMNa | 80 | 100 | — | — |
| | ETCD | 20 | — | 100 | 20 |
| | EM | — | — | — | 80 |
| Property | | | | | |
| Density (g/cm³) | | 0.950 | 0.940 | 1.02 | impossible to stretch |
| Heat shrinkage percentage (%) | | 50 | 40 | 38 | — |
| Natural shrinkage percentage (%) | | 2.5 | 4.0 | 2.0 | — |

Example 2

Using a T die extruder for multilayer formation, a 3-layered sheet of 2 polymers with the layer configuration of ETCD/EMNa/ETCD=18/144/18 μm was obtained. The temperature of the extruder was set at 220° C. for the interlayer, 230° C. for the two outermost layers and 230° C. for the die. A sheet of 13 cm×13 cm was cut out of the 3-layered sheet. After preheating at 80° C. for 2 minutes, the film piece was monoaxially stretched by 3 times toward the right angle direction (TD) against the extrusion direction, using a batch type stretching machine. Thus, a film having a layer thickness of ETCD/EMNa/ETCD=6/48/6 μm was obtained.

The properties of the film obtained are shown in TABLE 2.

Example 3

A 3-layered film having the same layer thickness was obtained in a manner similar to Example 2 except that a composition of 80 wt % of EMNa and 20 wt % of ETCD was used in place of EMNa in Example 2. The film was then monoaxially stretched under the same conditions as in Example 2 to obtain a film having a thickness of 60 μm.

The properties of the film obtained are shown in TABLE 2.

Comparative Example 4

A 3-layered film of the same layer thickness was molded in a manner similar to Example 2 except that PE was used in place of EMNa in EXAMPLE 2, otherwise all identical. The film was then monoaxially stretched under the same conditions as in Example 2 to obtain a film having a thickness of 60 μm.

The properties of the film obtained are shown in TABLE 2.

Comparative Example 5

A 3-layered film of the same layer thickness was molded in a manner similar to Example 2 except that PP was used in place of EMNa in Example 2, otherwise all identical. The film was then monoaxially stretched under the same conditions as in Example 2 to obtain a film having a thickness of 60 μm.

The properties of the film obtained are shown in TABLE 2.

TABLE 2

| | | Ex. 2 | Ex. 3 | Com. Ex. 4 | Com. Ex. 5 |
|---|---|---|---|---|---|
| Constitution of film | | | | | |
| Kind of film | | 3 layers | 3 layers | 3 layers | 3 layers |
| Thickness of film after stretching (μm) | | 60 | 60 | 60 | 60 |
| Composition & thickness of the two outer layers (μm) | | 6 | 6 | 6 | 6 |
| Composition of single layer film (wt %) | EMNa | 48 | — | — | — |
| | EMNa/ETCD = 80/20 wt % | — | 48 | — | — |
| | PE | — | — | 48 | — |
| | PP | — | — | — | 48 |
| Property | | | | | |
| Density (g/cm³) | | 0.941 | 0.962 | 0.942 | 0.930 |
| Heat shrinkage percentage (%) | | 36 | 36 | 35 | 37 |
| Natural shrinkage percentage (%) | | 2.5 | 2.0 | 3.3 | 4.5 |

Example 4

EMNa, 80 wt %, was blended with 20 wt % of ETCD to prepare a composition. Using the composition obtained, a film having a thickness of 180 μm was molded through a T die extruder, which cylinder temperature and the die were set at 220° C.

From the film obtained, a film was cut out in a size of 13 cm×13 cm. After preheating at 80° C. for 2 minutes, the film was monoaxially stretched by 3 times toward the right angle direction (TD) against the extrusion direction, using a batch type stretching machine, to give a film having a thickness of 60 μm.

The properties of the film obtained are shown in TABLE 3.

Comparative Example 6

A film was molded in a manner similar to Example 4 except that EMNa was used in an amount of 100 wt % in Example 4, otherwise all identical. The film was then monoaxially stretched under the same conditions as in Example 4 to obtain a film having a thickness of 60 μm.

The properties of the film obtained are shown in TABLE 3.

Comparative Example 7

A film was molded in a manner similar to Example 4 except that ETCD was used in an amount of 100 wt % in Example 4, otherwise all identical. The film was then monoaxially stretched under the same conditions as in Example 4 to obtain a film having a thickness of 60 μm.

The properties of the film obtained are shown in TABLE 3.

Comparative Example 8

A film was molded in a manner similar to Example 4 except that EM was used in place of EMNa in Example 4, otherwise all identical. The film was then monoaxially stretched under the same conditions as described above but the film was ruptured and unable to stretch.

TABLE 3

| | | Ex.4 | Com.Ex.6 | Com.Ex.7 | Com.Ex.8 |
|---|---|---|---|---|---|
| Composition (wt %) | EMNa | 80 | 100 | — | — |
| | ETCD | 20 | — | 100 | 20 |
| | EM | — | — | — | 80 |
| Property | Density (g/cm$^3$) | 0.950 | 0.940 | 1.02 | impossible to stretch |
| | Heat shrinkage percentage (%) | 50 | 40 | 38 | — |
| | Natural shrinkage percentage (%) | 2.5 | 4.0 | 2.0 | — |
| | Flexural modulus (Mpa) | 700 | 300 | 2400 | 510 |
| | Tensile strength (Mpa) | 40 | 35 | 50 | 31 |
| | Adhesive strength (N/cm) | 8 | 10 | 0.5 | 10 |
| | Solvent resistance | ○ | ○ | x | ○ |

APPLICABILITY TO INDUSTRIES

According to the present invention, there is provided a composition that enables to produce a molded article having excellent impact, adhesive and printing properties.

According to the present invention, there is provided a molded article, especially a heat shrinkable film, having a low natural shrinkage percentage, a high shrinkage percentage upon heating, a low density, excellent solvent resistance and hygiene. Thus, the molded article of the present invention has a promising development for a variety of applications.

According to the present invention, there is provided a composition that enables to give the molded article having excellent properties. The composition of the present invention is applicable to a variety of applications because of its excellent properties.

What is claimed is:

1. A molded article comprising as the main components an ionomer (A), which is a metal salt of a copolymer containing an α-olefin unit and an unsaturated carboxylic acid unit, and a resin (B) having an alicyclic structure in its molecule comprising (a) an addition copolymer of an α-olefin and a cyclic olein, or (b) a ring-opened polymer of a cyclic olefin or its hydrogenated products, wherein the cyclic olefin is at least one selected from the group consisting of cyclic olefins represented by the following formula (I) and (II):

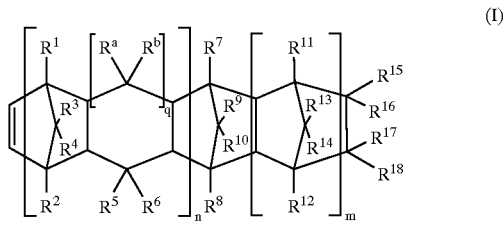

(I)

wherein each of $R^1$ through $R^{18}$, $R^a$ and $R^b$ independently represents hydrogen atom, a halogen atom, a hydrocarbon group, an ester group, cyano group or carboxyl group, n is 0 or 1, m is 0 or an integer of 1 or more, q is 0 or 1, provided that when q is 0, there is no bond between $R^a$ and $R^b$ but the carbon atoms on the both ends are combined together to form a 5-membered ring,

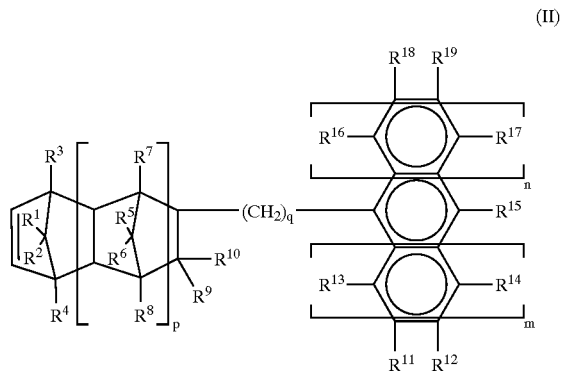

(II)

wherein p and q are 0 or an integer of at least 1, m and n are 0, 1 or 2, and each of $R^1$ through $R^{19}$ independently represents hydrogen atom, a halogen atom, a hydrocarbon group or an alkoxy group.

2. The molded article according to claim 1, wherein the molded article is composed of a composition comprising 1 to 99% by weight of the ionomer (A), which is a metal salt of a copolymer containing an α-olefin unit and an unsaturated carboxylic acid unit, and 99 to 1% by weight of the resin (B) having an alicyclic structure in its molecule.

3. The molded article according to claim 1, wherein the molded article is composed of a laminate comprising at least one layer containing the ionomer (A), which is a metal salt of a copolymer containing an α-olefin unit and an unsaturated carboxylic acid unit, having laminated thereon at least one layer containing the resin (B) having an alicyclic structure in its molecule.

4. The molded article according to any one of claims 1 through 3, wherein the ionomer (A) is a sodium and/or zinc metal salt of a copolymer of ethylene and methacrylic acid and/or acrylic acid.

5. The molded article according to claim 4, wherein the resin (B) having the alicyclic structure in its molecule is at least one selected from a copolymer of an α-olefin and a cyclic olefin, a ring-opened polymer of a cyclic olefin and a hydrogenated ring-opened polymer of a cyclic olefin.

6. The molded article according to claim 5, which is in the form of a film or sheet.

7. A stretched film obtained from the film or sheet according to claim 6.

8. A heat shrinkable film obtained from the film or sheet according to claim 6.

9. The molded article according to claim 4, which is in the form of a film or sheet.

10. A stretched film obtained from the film or sheet according to claim 9.

11. A heat shrinkable film obtained from the film or sheet according to claim 9.

12. The molded article according to any one of claims 1–3, wherein the resin (B) having the alicyclic structure in its molecule is at least one selected from a copolymer of a α-olefin and a cyclic olefin, a ring-opened polymer of a cyclic olefin and a hydrogenated ring-opened polymer of a cyclic olefin.

13. The molded article according to claim 12, which is in the form of a film or sheet.

14. A stretched film obtained from the film or sheet according to claim 13.

15. A heat shrinkable film obtained from the film or sheet according to claim 13.

16. The molded article according to any one of claims 1–3, which is in the form of a film or sheet.

17. A stretched film obtained from the film or sheet according to claim 16.

18. A heat shrinkable film obtained from the film or sheet according to claim 16.

19. A composition comprising an ionomer (A), which is a metal salt of a copolymer containing an α-olefin unit and an unsaturated carboxylic acid unit, and a resin (B) having an alicyclic structure in its molecule comprising (a) an addition copolymer of an α-olefin and a cyclic olefin, or (b) a ring-opened polymer of a cyclic olefin or its hydrogenated products, wherein the cyclic olefin is at least one selected from the group consisting of cyclic olefins represented by the formula (I) and (II):

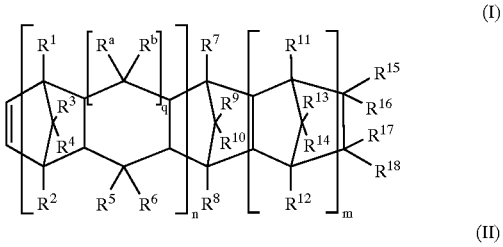

(I)

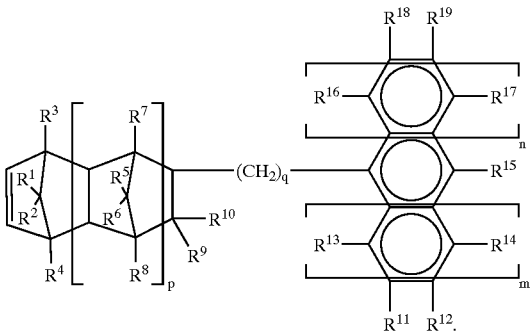

(II)

20. The composition according to claim 19, comprising 1 to 99% by weight of the ionomer (A), which is a metal salt of a copolymer containing an α-olefin unit and an unsaturated carboxylic acid unit, and 99 to 1% by weight of the resin (B) having an alicyclic structure in its molecule.

21. The composition according to claim 19 or 20, wherein the ionomer (A) is a sodium and/or zinc metal salt of a copolymer of ethylene and methacrylic acid and/or acrylic acid.

* * * * *